United States Patent
Fan et al.

(10) Patent No.: US 9,076,241 B2
(45) Date of Patent: Jul. 7, 2015

(54) METHODS AND SYSTEMS FOR DETECTING PATCH PANEL PORTS FROM AN IMAGE HAVING PERSPECTIVE DISTORTION

(71) Applicant: Xerox Corporation, Norwalk, CT (US)

(72) Inventors: Zhigang Fan, Webster, NY (US); Subarna Ghosh, Williamsville, NY (US); Hengzhou Ding, San Diego, CA (US)

(73) Assignee: Xerox Corporation, Norwalk, CT (US)

( * ) Notice: Subject to any disclaimer, the term of this patent is extended or adjusted under 35 U.S.C. 154(b) by 167 days.

(21) Appl. No.: 13/967,978

(22) Filed: Aug. 15, 2013

(65) Prior Publication Data
US 2015/0049918 A1 Feb. 19, 2015

(51) Int. Cl.
G06K 9/00 (2006.01)
G06T 7/60 (2006.01)
H04Q 1/02 (2006.01)

(52) U.S. Cl.
CPC ............... *G06T 7/602* (2013.01); *H04Q 1/136* (2013.01)

(58) Field of Classification Search
CPC ..... H04Q 1/136; G06T 7/0085; G06T 7/0042
See application file for complete search history.

(56) References Cited

U.S. PATENT DOCUMENTS

| | | | |
|---|---|---|---|
| 5,335,035 A | 8/1994 | Maeda | |
| 5,487,666 A * | 1/1996 | DiGiovanni | ................... 434/72 |
| 6,542,625 B1 | 4/2003 | Lee et al. | |
| 7,479,982 B2 | 1/2009 | Otani et al. | |
| 7,554,575 B2 | 6/2009 | Zandifar et al. | |
| 7,750,966 B2 | 7/2010 | Horie | |
| 7,978,845 B2 * | 7/2011 | Caveney et al. | ............... 379/413 |
| 8,306,935 B2 * | 11/2012 | Doorhy et al. | ................... 706/45 |
| 8,331,752 B2 * | 12/2012 | Biribuze et al. | ............... 385/135 |
| 8,345,938 B2 | 1/2013 | Yoshida | |
| 8,499,109 B2 | 7/2013 | Nakama | |
| 2003/0007077 A1 | 1/2003 | Maggi | |
| 2003/0034387 A1 | 2/2003 | Knowles et al. | |
| 2004/0085470 A1 | 5/2004 | Miyashita | |
| 2005/0002715 A1 | 1/2005 | Fries et al. | |
| 2008/0040277 A1 | 2/2008 | DeWitt | |
| 2008/0082426 A1 | 4/2008 | Gokturk et al. | |
| 2008/0130998 A1 | 6/2008 | Maidment et al. | |
| 2008/0177640 A1 | 7/2008 | Gokturk et al. | |
| 2009/0265251 A1 | 10/2009 | Dunlap et al. | |
| 2009/0319388 A1 | 12/2009 | Yuan et al. | |
| 2010/0156919 A1 | 6/2010 | Bala et al. | |
| 2010/0250588 A1 | 9/2010 | Kita | |
| 2010/0329547 A1 | 12/2010 | Cavet | |

(Continued)

OTHER PUBLICATIONS

Nine Sigma Request for Proposal #67653, "Optical Object Recognition and Feature Mapping by Mobile Devices", 2011, 2 pp.

*Primary Examiner* — Shefali Goradia
(74) *Attorney, Agent, or Firm* — Fox Rothschild LLP

(57) ABSTRACT

A method of estimating one or more dimensions of a patch panel may include receiving an image of a patch panel that comprises a plurality of ports and one or more gaps, extracting, by a computing device, a region of interest from the received image, detecting, by the computing device, one or more possible port edges from the region of interest, fitting the detected possible port edges to a cross-ratio constancy model to determine a port-to-gap-length ratio associated with the patch panel, using the port-length-to-gap-length ratio to determine a location of one or more final port edges, and determining a location of one or more final ports based on the location of the final port edges.

18 Claims, 7 Drawing Sheets

(56) References Cited

U.S. PATENT DOCUMENTS

| | | |
|---|---|---|
| 2011/0025873 A1 | 2/2011 | Wang et al. |
| 2011/0096142 A1 | 4/2011 | Kiyoshige |
| 2011/0234834 A1 | 9/2011 | Sugimoto |
| 2011/0298204 A1 | 12/2011 | Eschbach |
| 2012/0039514 A1 | 2/2012 | Sun et al. |
| 2012/0189190 A1 | 7/2012 | Bala et al. |
| 2013/0035081 A1 | 2/2013 | Sanger |
| 2013/0094715 A1 | 4/2013 | Benkley et al. |
| 2013/0127822 A1 | 5/2013 | Chen et al. |
| 2013/0183022 A1 | 7/2013 | Suzuki et al. |
| 2013/0198186 A1 | 8/2013 | Parakhin et al. |
| 2013/0293734 A1 | 11/2013 | Fan et al. |

* cited by examiner

METHODS AND SYSTEMS FOR DETECTING PATCH PANEL PORTS FROM AN IMAGE HAVING PERSPECTIVE DISTORTION

CROSS-REFERENCE TO RELATED APPLICATIONS

This application is related to U.S. patent application Ser. No. 13/968,016, filed on Aug. 15, 2013.

BACKGROUND

Patch panels are commonly used in data centers to connect servers and remote clients. Due to the complexity of these data connections, there can be many wire connectors originating from a single patch panel. A data center can include tens or even hundreds of patch panels.

Labeling ports of a panel requires obtaining the number of ports, accurate sizes of the ports and inter-port distances. A traditional way to generate labels for a patch panel is to use a measuring tape to take measurements, and input the measurements into a label printer. However, this process can be tedious and inefficient. A camera-equipped electronic device, such as a smartphone, may be used to take an image of the to-be-labeled ports and estimate the dimensions of the ports. However, it may be difficult to estimate port dimensions from an image that is not captured from a fully-frontal or from a distorted perspective.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a method of estimating one or more dimensions of a patch panel may include receiving an image of a patch panel that comprises a plurality of ports and one or more gaps, extracting, by a computing device, a region of interest from the received image, detecting, by the computing device, one or more possible port edges from the region of interest, fitting the detected possible port edges to a cross-ratio constancy model to determine a port-to-gap-length ratio associated with the patch panel, using the port-length-to-gap-length ratio to determine a location of one or more final port edges, and determining a location of one or more final ports based on the location of the final port edges.

In an embodiment, a system for estimating one or more dimensions of a patch panel may include a computing device and a computer-readable storage medium in communication with the computing device. The computer-readable storage medium may include one or more programming instructions that, when executed, cause the computing device to receive an image of a patch panel that comprises a plurality of ports and one or more gaps, extract a region of interest from the received image, detect one or more possible port edges from the region of interest, fit the detected possible port edges to a cross-ratio constancy model to determine a port-to-gap-length ratio associated with the patch panel, use the port-length-to-gap-length ratio to determine a location of one or more final port edges, and determine a location of one or more final ports based on the location of the final port edges.

DETAILED DESCRIPTION

The following terms shall have, for purposes of this application, the respective meanings set forth below:

A "gap" refers to an area between the end of one port and the beginning of an adjacent port.

A "patch panel" refers to a box in or associated with an electronic device that includes one or more ports. A patch panel may be used to connect two or more electronic or other devices via one or more wires or other connectors. For example, in a data center, a patch panel may be used to facilitate the connection a client and a server. As another example, in a recording studio, a patch panel may facilitate the connection of electronic instruments, microphones, recording devices, amplifiers and/or the like.

A "perspective distortion" refers to transformation of an object or its surrounding area in an image that differs from how the object actually appears. Examples of perspective distortions include, without limitation, an image that is captured from a perspective other than a full-frontal perspective.

A "port" refers to an electric socket of a patch panel that is configured to receive a wire or other connection.

A "port edge" refers to a vertical edge of a port.

Figure 1:
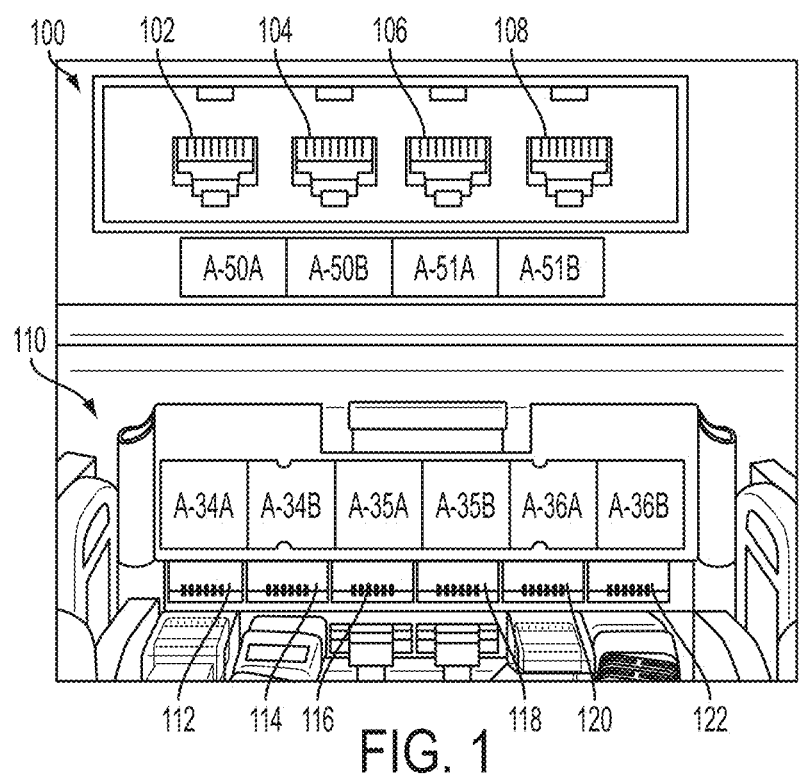
FIG. 1 shows an example patch panel according to an embodiment.

FIG. 1 illustrates an example patch panel of an electronic device according to an embodiment. Examples of electronic devices include, without limitation, personal computers, servers, mainframes, gaming systems, televisions, and portable electronic devices such as smartphones, personal digital assistants, cameras, tablet computers, laptop computers, media players, and/or the like. Other example electronic devices may include, without limitation, routers, switches, media hubs, and other networking devices, microphones, amplifiers and/or the like.

As illustrated by FIG. 1, ports of a patch panel may be divided into one or more groups of ports. Each group may contain one or more ports. For example, as illustrated by FIG. 1, a top patch panel 100 may include four ports 102, 104, 106, 108, and a bottom patch panel 110 may include six ports 112, 114, 116, 118, 120, 122. Additional and/or alternate numbers of groups and/or ports may be used within the scope of this disclosure.

As illustrated by FIG. 1, the inter-port distances of the ports on the top patch panel 100 differ from that of the ports on the bottom patch panel 110. As such, the resulting label strips illustrated in FIG. 1 differ for each patch panel.

Figure 2:
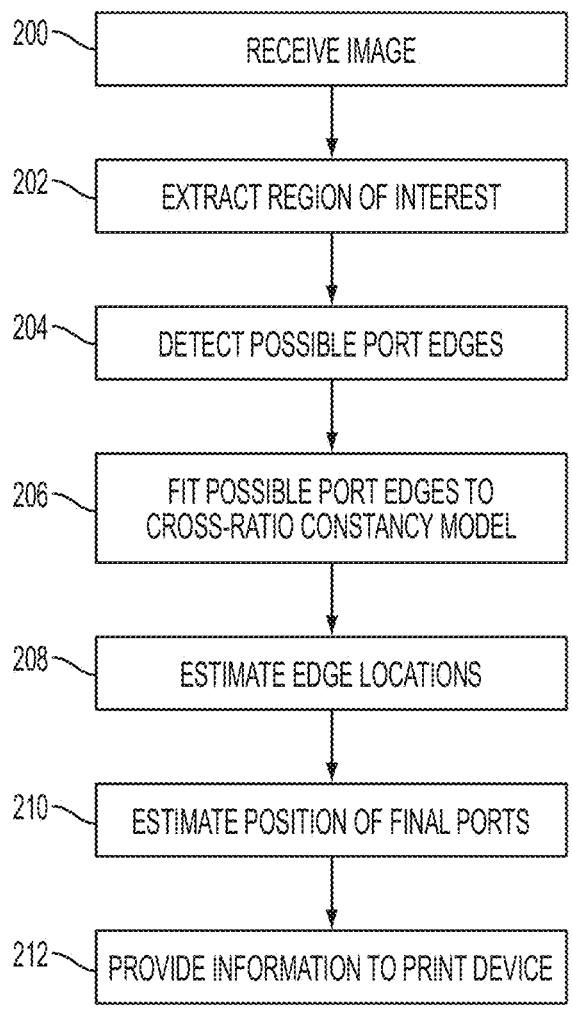
FIG. 2 illustrates a flow chart of an example method of estimating patch panel measurements according to an embodiment.

FIG. 2 illustrates a flow chart of an example method of estimating patch panel measurements according to an embodiment. As illustrated by FIG. 2, an image of one or more patch panels may be received 200. In an embodiment, an image may be a picture of a patch panel that may be captured by an imaging device. An imaging device may be a computing device configured to capture one or more images and may include, without limitation, a camera, a mobile device, a tablet, a smartphone and/or the like. In an embodiment, an image may be received from an imaging device.

In an embodiment, one or more markers may be used during the image capture process. A marker may be an electronic object that may be used to assist with alignment, position, location and/or the like of an image. In an embodiment, one or more markers may be displayed in a user interface of an imaging device. One or more markers may be provided in a user interface to allow users to align at least a portion of the image, reduce distortion of the image or change the perspective or view of an image. In an embodiment, a marker may be overlaid on a frame or screen, such as a preview screen, of an imaging device.

Figure 3:
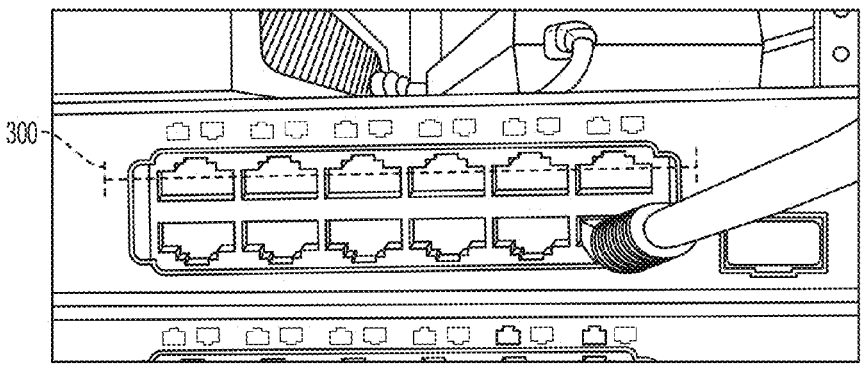
FIGS. 3-5 illustrate example markers according to various embodiments.
Figure 4:
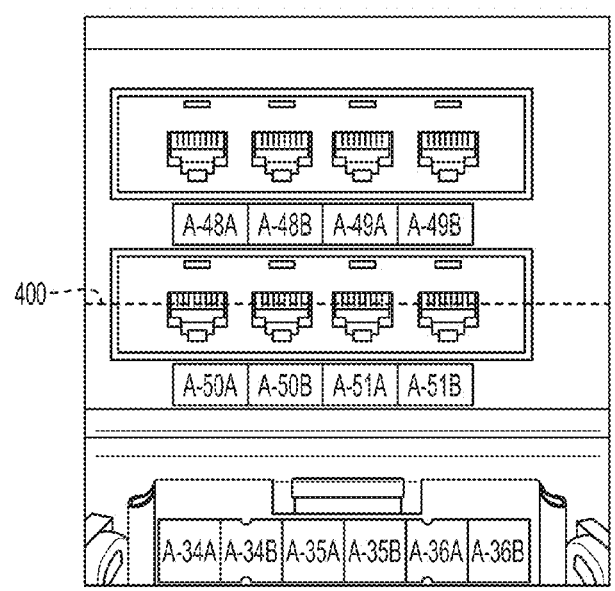
Figure 5:
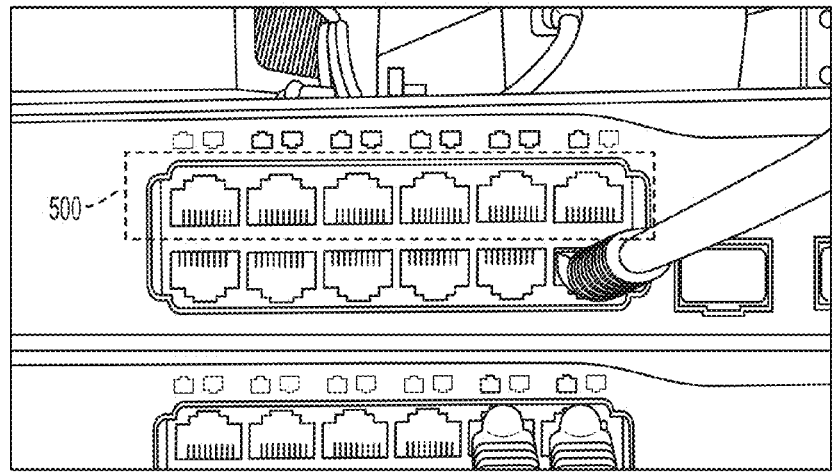

FIGS. 3-5 illustrate example markers according to various embodiments. FIG. 3 illustrates a marker 300 shown as a horizontal straight line segment with starting and ending points 302, 303 that are shown as two vertical lines. A user may be able to align the marker with one or more ports or patch panels by moving the marker, a start point of a marker, an end point of a marker, and/or the like. As such, a marker may be used to identify one or more ports or patch panels to be analyzed. FIG. 4 illustrates an example marker 400 depicted as a horizontal line. FIG. 5 illustrates an example marker 500 depicted as a rectangular box. In an embodiment, the size and/or aspect ratio of the box may be adjusted by a user. For example, a user may edit the box using a user interface of an imaging device. Additional and/or alternate shaped and/or sized markers may be used within the scope of this disclosure.

In an embodiment, a region of interest may be extracted 202 from the captured image. A region of interest may be extracted 202 based on the location of one or more markers. For example, a width, a height or another dimension with respect to a marker may be extracted as a region of interest. For instance, an extracted region of interest may include a portion of an image that includes a quarter of an inch from a marker in all directions. Additional and/or alternate areas may be used within the scope of this disclosure.

Figure 6:
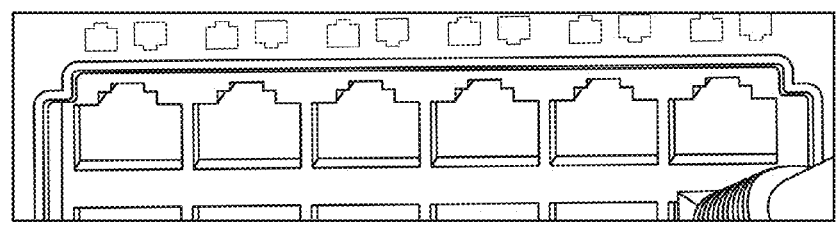
FIG. 6 illustrates an example region of interest according to an embodiment.

FIG. 6 illustrates an example region of interest extracted from the image shown in FIG. 3. As illustrated by FIG. 6, the extracted region of interest includes the patch panel corresponding to the marker 300 in FIG. 3.

Figure 7:
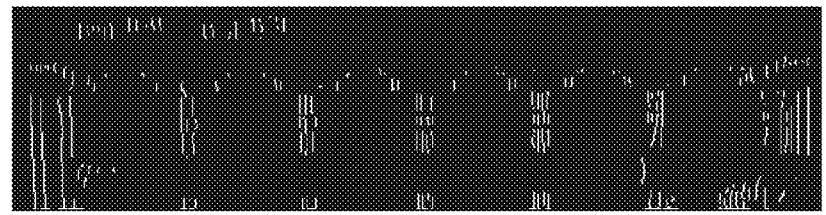
FIG. 7 illustrates an example edge map according to an embodiment.

Referring back to FIG. 2, in an embodiment, one or more possible port edges may be detected 204 using the region of interest. One or more possible port edges may be extracted from a region of interest using an edge detection algorithm such as, for example, a Canny edge detection algorithm, to create an edge map. In an embodiment, an edge detection algorithm may locate one or more vertical lines or edges from an image. FIG. 7 illustrates an example edge map according to an embodiment.

Figure 8:
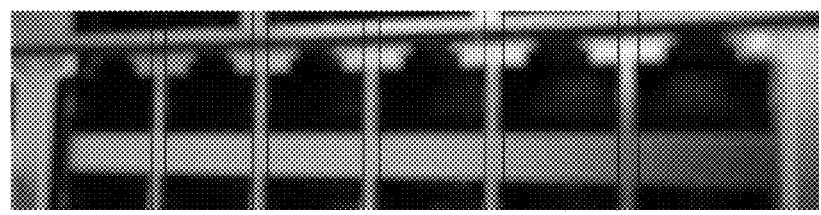
FIG. 8 illustrates an example patch panel according to an embodiment.

A horizontal edge intensity profile may be calculated based on the edge map. In an embodiment, a column having a number of edge pixels greater than a certain threshold may be considered a vertical line. Consecutive lines may be combined to produce a final set of lines. FIG. 8 illustrates a patch panel image with detected vertical lines overlaid.

Figure 9:
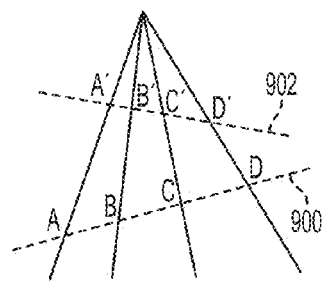
FIG. 9 illustrates an example original line in three-dimensional space and an example projected line according to an embodiment.

In an embodiment, one or more possible port edges may be fit 206 to a cross-ratio constancy model. Under a cross-ratio constancy model, for an image with perspective distortion, the cross ratio of certain points on an original line in three-dimensional space may be the same as the cross-ratio of certain points on a projected line. For example, FIG. 9 illustrates an original line 900 in three-dimensional space and a projected line 902. The original line may include points A, B, C, D while the projected line may include points A', B', C', D'. In an embodiment, A', B', C', D' may be projections of points A, B, C, D, respectively.

In an embodiment, a cross-ratio constancy model may be represented by the following equation:

$$\frac{AC}{BC} : \frac{AD}{BD} = \frac{A'C'}{B'C'} : \frac{A'D'}{B'D'}$$

In an embodiment, a candidate gap may be identified from a region of interest. A candidate gap may represent possible space between ports of a patch panel according to an embodiment. At least one trailing edge associated with the candidate gap may be identified, and at least one leading edge associated with the candidate gap may be identified. A trailing edge may refer to an edge located to one side of a candidate gap, while a leading edge may refer to an edge located on another, opposite side of a candidate gap.

Figure 10:
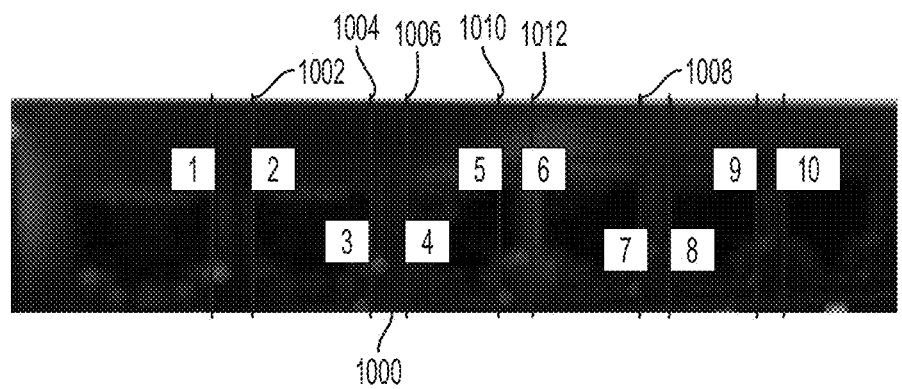
FIG. 10 illustrates an example patch panel according to an embodiment.

In an embodiment, two trailing edges and two leading edges may be selected for a candidate gap. FIG. 10 illustrates the image of FIG. 8 with the vertical lines labeled. In an embodiment, if the candidate gap 1000 in FIG. 10 is identified, Trailing Edge 2 1002 and Trailing Edge 3 1004 may be selected, and Leading Edge 4 1006 and Leading Edge 5 1010 may be selected.

In an embodiment, a port-to-gap-length ratio may be estimated using the selected edges. The port length in real dimension may be denoted by a, and the gap length in real dimension may be denoted as b. In an embodiment, the pixel distance or projected distance between one or more pairs of selected edges may be denoted. For example, using FIG. 10 as an example, the distance between Trailing Edge 2 1002 and Trailing Edge 3 1004 may be denoted as x, the distance between Trailing Edge 3 and Leading Edge 4 1006 may be denoted by y, and the distance between Leading Edge 4 and Leading Edge 5 1010 may be denoted by z.

In an embodiment, the real distance between one or more pairs of selected edges may be denoted. A real distance may be measured in terms of port lengths and/or gap lengths. For example, referring to FIG. 10, Trailing Edge 2 1002 and Trailing Edge 3 1004 has one port in between, so the real distance between Trailing Edge 2 and Trailing Edge 3 may be denoted as a. Trailing Edge 3 1004 and Leading Edge 4 1006 have a single gap in between, so the real distance between these two edges may be denoted as b.

Applying the projected distances and real distances using edges 1002, 1004, 1006, 1010 to the cross-ratio constancy equation above may result in the following:

$$\frac{x+y}{y} : \frac{x+y+z}{y+z} = \frac{a+b}{b} : \frac{3a+2b}{2a+2b}$$

In an embodiment, the left side of the above equation may be denoted by an intermediate variable such as $$p = \frac{(x+y)(y+z)}{y(x+y+z)}.$$

The equation may be factored into:

$$2\left(\frac{a}{b}\right)^2 + (4-3p)\left(\frac{a}{b}\right) + 2(1-p) = 0$$

The solution to the above equation is the port-to-gap length ratio, which may be expressed as follows:

$$r = \frac{a}{b} = \frac{3p - 4 + \sqrt{p(9p-8)}}{4}$$

In an embodiment, the computed port-to-gap length ratio may be used to estimate 208 edge locations for one or more edges of an area of interest. Potential vertical edge locations may be estimated by applying and solving the cross-ratio constancy equation repeatedly, given the port-to-gap-length ratio.

In an embodiment, one or more locations of the vertical lines that are detected 204 in the region of interest may be compared to one or more of the estimated edge locations. If the location of a detected vertical line is within a certain threshold distance from the location of an estimated edge location, the detected vertical line may be considered as a final port edge. If the location of a detected vertical line is outside of a certain threshold distance from the location of an estimated edge location, the detected vertical line may not be considered as a final port edge. Instead, the estimated edge location may be considered as a final port edge.

Figure 11:
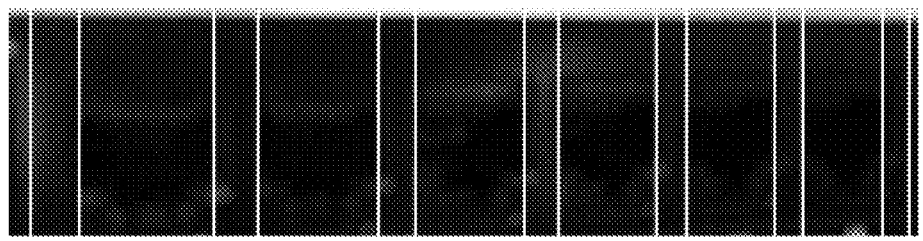
FIG. 11 illustrates example final port edges according to an embodiment.

In an embodiment, one or more final port edges may be displayed 208. For example, one or more final port edges may be displayed as an overlay to the received image. FIG. 11 illustrates example final port edges corresponding to the image shown in FIG. 10. As illustrated by FIG. 11, Edge 5 1010 and Edge 6 1012 have been rejected in the model. Instead, the model has filled in a pair of edges that are more aligned with the candidate gap.

In an embodiment, the port-to-gap-length ratio and positions of the final port edges may be refined with a least squares fitting. The port edges that have been retained after rejection may be used in a least squares type cost function. The cost function may be optimized using an optimization method to obtain a best estimate of the port-to-gap length ratio as well as positions of the final port edges.

In an embodiment, referring back to FIG. 2, steps 206 and 208 may be repeated one or more times using different candidate gaps and corresponding pairs of leading and trailing edges. The best result out of the trials may be selected as the ultimate port-to-gap-length ratio and positions of the final edges.

In an embodiment, a position, location and/or the like of one or more final ports may be estimated 210 based on one or more of the final port edges. For example, a location of a final port may be an area between two final port edges. Similarly, a position of a gap may be estimated based on one or more of the final port edges. For example, a location of a gap may be an area between a pair of final ports.

In an embodiment, information relating to the location of one or more final port edges and/or ports may be provided 212 to a print device. For example, information relating to an inter-port distance, a port-length-to-gap-length ratio and/or the like may be provided to a print device. The print device may use this information to generate an image, a print out, a document and/or like that corresponds to the patch panel illustrated in the received image. For example, a print device may generate one or more labels that correspond to the patch panel illustrated in the received image. In an embodiment, the position of one or more labels may align with the locations of one or more ports of the patch panel. For example, a print device may generate a sheet of labels where the position and dimensions of each label align with the position and dimensions of a port of a port panel.

Figure 12:
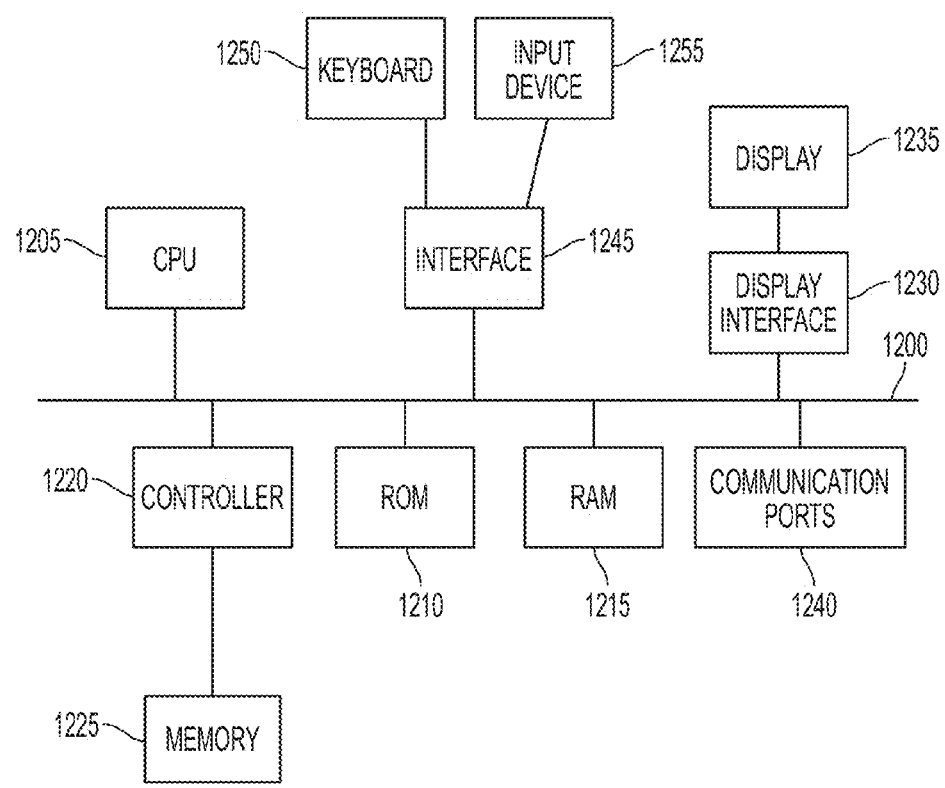
FIG. 12 illustrates a block diagram of example hardware that may be used to contain or implement program instructions according to an embodiment.

FIG. 12 depicts a block diagram of hardware that may be used to contain or implement program instructions. A bus 1200 serves as the main information highway interconnecting the other illustrated components of the hardware. CPU 1205 is the central processing unit of the system, performing calculations and logic operations required to execute a program. CPU 1205, alone or in conjunction with one or more of the other elements disclosed in FIG. 12, is an example of a production device, computing device or processor as such terms are used within this disclosure. Read only memory (ROM) 1210 and random access memory (RAM) 1215 constitute examples of non-transitory computer-readable storage media.

A controller 1220 interfaces with one or more optional non-transitory computer-readable storage media 1225 to the system bus 1200. These storage media 1225 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 1210 and/or the RAM 1215. Optionally, the program instructions may be stored on a tangible non-transitory computer-readable medium such as a compact disk, a digital disk, flash memory, a memory card, a USB drive, an optical disc storage medium, such as a Blu-ray™ disc, and/or other recording medium.

An optional display interface 1230 may permit information from the bus 1200 to be displayed on the display 1235 in audio, visual, graphic or alphanumeric format. Communication with external devices, such as a printing device, may occur using various communication ports 1240. A communication port 1240 may be attached to a communications network, such as the Internet or an intranet.

The hardware may also include an interface 1245 which allows for receipt of data from input devices such as a keyboard 1250 or other input device 1255 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of estimating one or more dimensions of a patch panel, the method comprising:
   receiving an image of a patch panel, wherein the patch panel comprises a plurality of ports and one or more gaps;
   extracting, by a computing device, a region of interest from the received image;
   detecting, by the computing device, one or more possible port edges from the region of interest;
   fitting the detected possible port edges to a cross-ratio constancy model to determine a port-to-gap-length ratio associated with the patch panel;
   using the port-length-to-gap-length ratio to determine a location of one or more final port edges; and
   determining a location of one or more final ports based on the location of the final port edges.

2. The method of claim 1, wherein:
   receiving an image of a patch panel comprises receiving the image of the patch panel from an imaging device, wherein the image comprises a perspective distortion.

3. The method of claim 2, further comprising:
   presenting, by the imaging device, one or more markers on a user interface to assist with alignment of the image.

4. The method of claim 3, wherein:
   receiving an image of a patch panel further comprises receiving an indication of the one or more markers;
   extracting a region of interest from the received image comprises extracting the region of interest based on the received indication.

5. The method of claim 1, wherein detecting one or more possible port edges from the region of interest comprises:
   applying an edge detection algorithm to the region of interest to identify one or more vertical lines; and
   creating an edge map that includes the identified vertical lines.

6. The method of claim 1, wherein fitting the detected possible port edges to a cross-ratio constancy model to determine a port-to-gap-length ratio associated with the patch panel comprises:
   identifying a candidate gap from the region of interest;
   identifying a first trailing edge and a second trailing edge associated with the candidate gap;
   identifying a first leading edge and a second leading edge associated with the candidate gap;
   determining the port-to-gap-length ratio by solving $$\frac{AC}{BC} : \frac{AD}{BD} = \frac{A'C'}{B'C'} : \frac{A'D'}{B'D'}$$

where:
   AC is a pixel distance between the first trailing edge and the first leading edge from the image,
   BC is a pixel distance between the second trailing edge and the first leading edge from the image,
   AD is a pixel distance between the first trailing edge and the second leading edge from the image,
   BD is a pixel distance between the second trailing edge and the second leading edge from the image,
   A'C' is a physical distance between the first trailing edge and the first leading edge,
   B'C' is a physical distance between the second trailing edge and the first leading edge,
   A'D' is a physical distance between the first trailing edge and the second leading edge,
   B'D' is a physical distance between the second trailing edge and the second leading edge.

7. The method of claim 1, wherein using the port-to-gap-length ratio to determine a location of one or more final port edges comprises:
   determining a location of one or more estimated port edges based on the determined port-to-gap-length ratio;
   for each estimated port edge:
      comparing the location of the estimated port edge to a location of one or more of the possible port edges,
      if the location of the estimated port edge is within a threshold distance from the possible port edge, identifying the estimated port edge as a final port edge, otherwise, identifying the possible port edge as the final port edge.

8. The method of claim 7, further comprising generating a modified image that comprises the received image and an overlay showing the final port edges and their locations.

9. The method of claim 7, further comprising sending information about the final port edges to a print device so that the print device prints one or more labels having positions that align with the final ports.

10. A system for estimating one or more dimensions of a patch panel, the system comprising:
    a computing device; and
    a computer-readable storage medium in communication with the computing device, wherein the computer-readable storage medium comprises one or more programming instructions that, when executed, cause the computing device to:
       receive an image of a patch panel, wherein the patch panel comprises a plurality of ports and one or more gaps,
       extract a region of interest from the received image,
       detect one or more possible port edges from the region of interest,
       fit the detected possible port edges to a cross-ratio constancy model to determine a port-to-gap-length ratio associated with the patch panel,
       use the port-length-to-gap-length ratio to determine a location of one or more final port edges, and
       determine a location of one or more final ports based on the location of the final port edges.

11. The system of claim 10, wherein the one or more programming instructions that, when executed, cause the computing device to receive an image of a patch panel comprise one or more programming instructions that, when executed, cause the computing device to receive the image of the patch panel from an imaging device, wherein the image comprises a perspective distortion.

12. The system of claim 11, further comprising:
    an imaging device in communication with the computing device, wherein the imaging device is configured to present one or more markers on a user interface to assist with alignment of the image.

13. The system of claim 10, wherein:
    the one or more programming instructions that, when executed, cause the computing device to receive an image of a patch panel comprises one or more programming instructions that, when executed, cause the computing device to receive an indication of one or more markers;

the one or more programming instructions that, when executed, cause the computing device to extract a region of interest from the received image comprise one or more programming instructions that, when executed, cause the computing device to extract the region of interest based on the received indication.

14. The system of claim 10, wherein the one or more programming instructions that, when executed, cause the computing device to detect one or more possible port edges from the region of interest comprise one or more programming instructions that, when executed, cause the computing device to:

apply an edge detection algorithm to the region of interest to identify one or more vertical lines; and create an edge map that includes the identified vertical lines.

15. The system of claim 10, wherein the one or more programming instructions that, when executed, cause the computing device to fit the detected possible port edges to a cross-ratio constancy model to determine a port-to-gap-length ratio associated with the patch panel comprise one or more programming instructions that, when executed, cause the computing device to:

identify a candidate gap from the region of interest;

identify a first trailing edge and a second trailing edge associated with the candidate gap;

identify a first leading edge and a second leading edge associated with the candidate gap;

determine the port-to-gap-length ratio by solving $$\frac{AC}{BC} : \frac{AD}{BD} = \frac{A'C'}{B'C'} : \frac{A'D'}{B'D'}$$

where:

AC is a pixel distance between the first trailing edge and the first leading edge from the image, BC is a pixel distance between the second trailing edge and the first leading edge from the image, AD is a pixel distance between the first trailing edge and the second leading edge from the image, BD is a pixel distance between the second trailing edge and the second leading edge from the image, A'C' is a physical distance between the first trailing edge and the first leading edge, B'C' is a physical distance between the second trailing edge and the first leading edge, A'D' is a physical distance between the first trailing edge and the second leading edge, B'D' is a physical distance between the second trailing edge and the second leading edge.

16. The system of claim 10, wherein the one or more programming instructions that, when executed, cause the computing device to use the port-to-gap-length ratio to determine a location of one or more final port edges comprise one or more programming instructions that, when executed, cause the computing device to:

determine a location of one or more estimated port edges based on the determined port-to-gap-length ratio;

for each estimated port edge:

compare the location of the estimated port edge to a location of one or more of the possible port edges, if the location of the estimated port edge is within a threshold distance from the possible port edge, identify the estimated port edge as a final port edge, otherwise, identify the possible port edge as the final port edge.

17. The system of claim 16, further wherein the computer-readable storage medium further comprises one or more programming instructions that, when executed, cause the computing device to generate a modified image that comprises the received image and an overlay showing the final port edges and their locations.

18. The system of claim 16, wherein the computer-readable storage medium further comprises one or more programming instructions that, when executed, cause the computing device to send information about the final port edges to a print device so that the print device prints one or more labels having positions that align with the final ports.

* * * * *